United States Patent
Izumi et al.

(10) Patent No.: US 6,754,441 B1
(45) Date of Patent: Jun. 22, 2004

(54) DATA RECORDING DEVICE, DATA RECORDING/REPRODUCING DEVICE, DATA RECORDING METHOD, AND DATA RECORDING/REPRODUCING METHOD FOR RECORDING IMAGE/VOICE DATA

(75) Inventors: Akihiko Izumi, Kanagawa (JP); Kazuo Kamiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/269,081
(22) PCT Filed: Jul. 17, 1998
(86) PCT No.: PCT/JP98/03229
§ 371 (c)(1), (2), (4) Date: May 12, 1999
(87) PCT Pub. No.: WO99/04564
PCT Pub. Date: Jan. 28, 1999

(30) Foreign Application Priority Data

Jul. 18, 1997 (JP) .......................... P09-193627

(51) Int. Cl.⁷ .............................................. H04N 5/781
(52) U.S. Cl. ......................... 386/125; 386/126; 711/114
(58) Field of Search .......................... 386/45, 125, 126, 386/21, 116; 360/47, 53, 54; 711/114; 714/6–7, 758, 770; H04N 5/76, 5/781, 9/79, 5/92

(56) References Cited

U.S. PATENT DOCUMENTS 5,625,461 A * 4/1997 Okamoto et al. ............. 386/53
5,630,007 A * 5/1997 Kobayashi et al. .......... 386/113
5,905,847 A * 5/1999 Kobayashi et al. .......... 386/125
5,923,817 A * 7/1999 Nakamura ................... 386/125
6,175,682 B1 * 1/2001 Tanaka et al. ............... 386/112
6,185,368 B1 * 2/2001 Iwasaki et al. .............. 386/125
6,198,876 B1 * 3/2001 Iwasaki et al. .............. 386/125
6,324,334 B1 * 11/2001 Morioka et al. ............. 386/125
6,404,975 B1 * 6/2002 Boparkikar et al. ......... 386/125

FOREIGN PATENT DOCUMENTS

| JP | 7-235143 | 9/1995 | ........... G11B/20/18 |
| JP | 9-149354 | 6/1997 | ........... H04N/5/765 |
| JP | 9-200673 | 7/1997 | ........... H04N/5/765 |
| JP | 9-282801 | 10/1997 | ........... G11B/20/12 |

* cited by examiner

Primary Examiner—Thai Tran
(74) Attorney, Agent, or Firm—Bell Boyd & Lloyd LLC

(57) ABSTRACT

A data recording device receives data including at least image data or voice data of a plurality of channels and records the data in a plurality of recording media which is accessible nonlinearly within time slots allotted to the respective channels. The data recording device includes a recording device which allots the data to the respective recording media and records the allotted data in the recording media, and a controller which controls the recording means so as to record correction data representing corrected signal levels of the data in the recording media together with the allotted data.

26 Claims, 3 Drawing Sheets

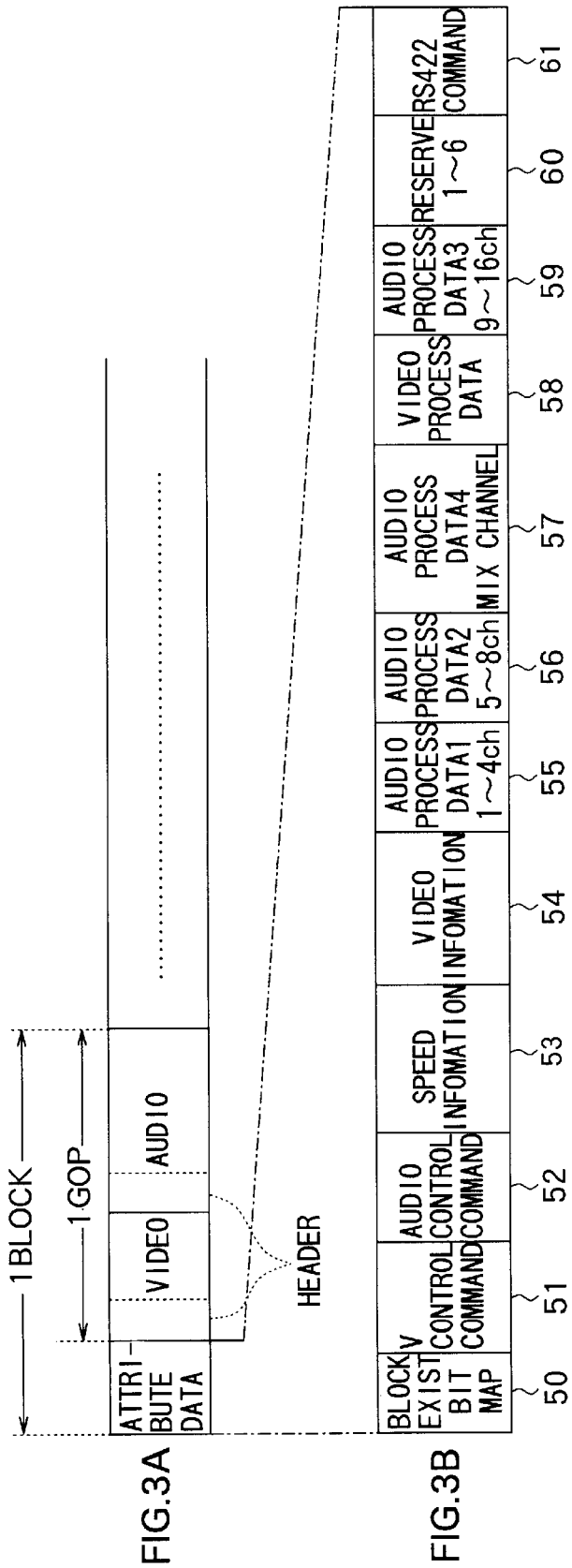

DATA RECORDING DEVICE, DATA RECORDING/REPRODUCING DEVICE, DATA RECORDING METHOD, AND DATA RECORDING/REPRODUCING METHOD FOR RECORDING IMAGE/VOICE DATA

TECHNICAL FIELD

The present invention relates to a recording device, a data recording/reproducing device, a recording method, and a recording/reproducing method.

BACKGROUND ART

In recent years, following multi-channeling for provision of information owing to the widespread use of CATV (cable television) or the like, a demand for recording or reproducing or recording while recording a plurality of image/voice data simultaneously from single data recording/reproducing device, unlike the way conventional VTRs (video cassette recorder) operate, has been increasing. In order to satisfy this demand, a data recording/reproducing device called a video server (also called AV (Voice/Image) server), which records and reproduces plural voice/image data using random accessible recording/reproducing media such as a hard disk, is becoming widespread.

In general, a video server in a broadcasting station needs to have high transfer rate of requested data and have a large capacity to record data for a long period of time to maintain image and voice quality. To satisfy the needs, it has been tried to acquire higher transfer rate of data and a larger capacity by using a data recording/reproducing device comprising a plurality of hard disk (HD in the followings) devices which can perform accumulation of image and voice data, and parallel processing. Further, it has been tried to record parity data so as to ensure the credibility even if one of the HD devices accidentally breaks down. As a result, even in a case where different numbers of channel are requested due to contents or broadcasting systems of programs provided by a broadcasting station, a multi-channel video server which is provided for a variety of usage patterns can be implemented by building VOD (video on demand) or NVOD (near video on demand) systems and so on, through separately recording material data consist of a plurality of voice and video materials and performing multi-channel sending out simultaneously, and shifting the reproducing time of the same material data in by multi-channel.

In a data recording/reproducing device used in such a video server, RAID (Reduntant Arrays of Inexpensive Disks) technology formed with a plurality of hard disk drives (called HDD in the followings) which are composed of a plurality of HD proposed in an article ("A case for Redundant Arrays of Inexpensive Disks (RAID)" ACM SIGMOND Conference, Chicago, Ill., Jun. 1–3, 1988) presented by Patterson and some others in 1988, is used.

In the article, the RAID is classified into five from RAID-1 to RAID-5. The RAID-1 is a method of writing the same contents to two HDDs. The RAID-3 is a method of recording input data to a plurality of HDDs by dividing the data into a specific length, while producing parity data which is exclusive OR of data blocks mutually corresponding to each HDD and writing the parity data to another HDD. Further, the RAID-5 is a method of recording a divided data as a data block to an HDD having a dividing unit of data (data block) large, while recording the result (parity data) of taking exclusive OR of data block (parity data), corresponding mutually to each HDD as parity blocks to other HDDs while allotting the parity blocks to other HDDs.

Other RAID will be referred in the article mentioned above.

A large quantity of image/voice data is recorded in the video server formed as described. It is not rare to record images and voices filmed in coverage in the video data in which another images and voices filmed in another coverage is recorded. There is a case where, for example, intensity level or hue of images and volume of voices vary between image data and voice data filmed in different coverage and different locations.

Further, there is a case where intensity level of images and volume of voice also vary when performing editing processing on image/voice data which has been once accumulated in a video server. When performing the editing processing, deterioration of voice quality can not be avoided since data is needed to be elongated to edit and recompressed when the compress processing such as MPEG (Motion Picture Expert Group) method is applied to the image data/voice data accumulated in the video server.

DISCLOSURE OF INVENTION

The present invention is presented to overcome problems mentioned above. Therefore, it is an object of the present invention to provide a data recording device, a data recording/reproducing device, a data recording method and a data recording/reproducing method which can correct the differences between materials (unit of data composed of image data and accompanying voice data) with easy management.

A data recording device of the invention receives data which at least includes either image data or voice data of a plurality of channels, and records data in a plurality of non-linear accessible recording media within time slots allotted to each channel. The data recording device comprises recording means for recording the data being allotted to each of the non-linear accessible recording media, and control means for controlling the recording means so as to record correction data representing corrected signal levels of the data in the recording media along with the data.

A data recording method of the invention receives data which at least includes either image data or voice data of a plurality of channels, and records data in a plurality of non-linear accessible recording media within time slots allotted to each channel. The data recording method includes a first step of recording the data being allotted to each of the non-linear accessible recording media and the correction data representing signal levels of the data in the recording media.

A data recording/reproducing device of the invention receives data which at least includes either image data or voice data of a plurality of channels, records data in a plurality of non-linear accessible recording media within time slots allotted to each channel, and reproduces data recorded in the recording media and outputs the data of a plurality of the channels. The recording/reproducing device comprises recording/reproducing means for recording the data being allotted to each of the non-linear accessible recording media, and for reproducing and restoring the data recorded being allotted and control means for controlling the recording/reproducing means so as to record correction data representing corrected signal levels of the data in the recording media along with the data.

A data recording/reproducing method of the invention receives data which at least includes either image data or voice data of a plurality of channels, records data in a plurality of non-linear accessible recording media within time slots allotted to each channel, reproduces data recorded in the recording media, and outputs data of a plurality of channels. The data recording/reproducing method includes a first step of recording the data being allotted to each of the non-linear accessible recording media, and of reproducing and restoring the data recorded being allotted. Further, correction data representing signal levels of the data is recorded in the first step along with the data.

Another data recording/reproducing device of the invention receives data which at least includes either image data or voice data of a plurality of channels, records data in a plurality of non-linear accessible recording media within time slots allotted to each channel, reproduces data recorded in the recording media, and outputs data of a plurality of channels. The data recording/reproducing device comprises encode means for compressing data inputted to each channel and for outputting the compressed data to which correction data representing signal levels of the data is superposed, and recording/reproducing means for recording the compressed data being allotted to each of the non-linear accessible recording media, for recording the correction data in a predetermined region of the recording media, for reproducing and restoring the compressed data recorded being allotted, and for reproducing the correction data recorded in the predetermined region, and encode means for elongating the compressed data outputted from the recording/reproducing means.

Another data recording/reproducing method of the invention receives data which at least includes either image data or voice data of a plurality of channels, records data in a plurality of non-linear accessible recording media within time slots allotted to each channel, reproduces data recorded in the recording media, and outputs data of a plurality of the channels. The data recording/reproducing method includes a first step of compressing the data inputted to each channel and outputting the compressed data to which correction data representing signal levels of the data is superposed, and a second step of recording the compressed data outputted from the first step and the correction data, of recording the compressed data being allotted to each of the non-linear accessible recording media, of recording the correction data in a predetermined region of the recording media, of reproducing and restoring the compressed data recorded being allotted, and of reproducing the correction data recorded in the predetermined region, and a third step of elongating the compressed data outputted from the second step.

Other objects, characteristics and advantages of the invention will be made sufficiently evident with description in the followings.

BRIEF DESCRIPTION OF THE DRAWINGS

FIG. 3A and FIG. 3B are descriptive illustrations showing a constitution of MPEG-type compressed data obtained by compressing with an encoder shown in FIG. 1.

BEST MODE FOR CARRYING OUT THE INVENTION

Embodiments of the invention will be described in detail with reference to the figures in the followings.

Figure 1:
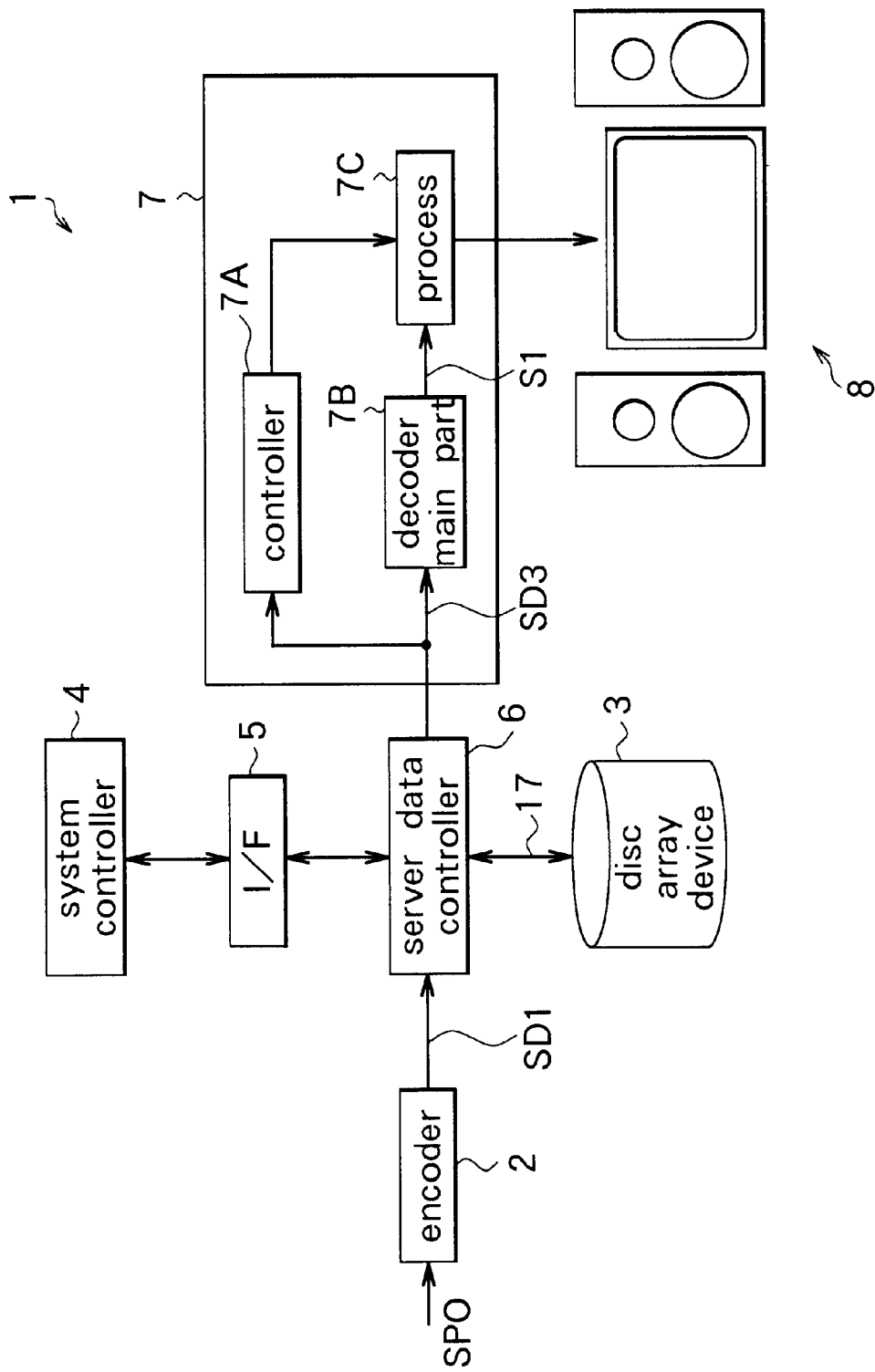
FIG. 1 is a block diagram showing a data sending out device 1 according to an embodiment of the invention.

FIG. 1 is a block diagram showing a data sending out device 1 according to an embodiment of the invention.

The data sending out device 1 mainly comprises an encoder 2, a disk array device 3, a system controller 4, an interface (I/F) 5, a server data controller 6 and a decoder 7. In FIG. 1, an example in which a monitor device 8 is connected to the decoder 7 of the data sending out device 1 is shown. Of course, the decoder 7 may be connected to, in addition to the monitor device 8, an in-station sending out device so that data decoded by the decoder 7 is sent out from a broadcasting station. Further, it may be connected to an editing machine which edits data accumulated in the disk array device 3.

Next, each constitution will be described in detail.

The encoder 2 encodes input data inputted from outside so that the data can be accumulated in the disk array device 3.

Input data may be data covered by a camcorder (video camera), data directly picked up by a camera, or data inputted via satellite circuit and so on. Here, data to be inputted is data which includes at least either image data or voice data.

Encoding of input data by the encoder 2 according to the embodiment is performed through MPEG-style compressing method which takes advantage of correlation between frames. Of course, various compressing methods, such as DV method applied to home digital VTR may also be used.

Signal levels of at least either image data or voice data inputted here is outputted without any correction or alteration. Data outputted from the encoder 2 is outputted to the server data controller 6.

The system controller 4 inputs and outputs various kinds of control data between the server data controller 6 via the interface (I/F) 5, and controls the whole operation of the data sending out device 1. That is, the system controller 4 orders the server data controller 4 to record inputted data and orders to reproduce data accumulated in the disk array device 3. Further, the system controller 4 makes an editing list by operation of an operator, and orders to reproduce data accumulated in the disk array device 3 according to the editing list.

Further, the system controller 4 outputs control data which corresponds to reproducing data, especially to intensity level or hue of image data and signal levels of voice data, upon receiving an order from an operator when reproduction of the data from the disk array device 3 is performed.

The interface (I/F) 5 serves as an interface between the system controller 4 and the server data controller 6, and converts the control data outputted from the system controller 4 to a format which can be processed in the server data controller 6. Further, the interface (I/F) 5 converts the control data outputted from the server data controller 6 to a format which can be processed in the system controller 4.

The server controller 6 outputs data outputted from the encoder 2 to the disk array device 3 based on either control data from the system controller 4 inputted via the above-mentioned interface 5, or an outside control command allocated to a header encoded by the encoder 2. Further, the server controller 6 makes data recorded in the disk array device 3 be reproduced and output them to the decoder 7 based on the control data from the system controller 4.

The server data controller 6 separates data outputted from the encoder 2 into attribute data and image/voice data, and records them to a predetermined region of the disk array device 3 individually. It will be described in detail later.

The decoder 7 either elongates compressed data which is inputted data outputted from the server controller 6, or converts the data to a format which can be outputted outside before outputting the data. The decoder 7 comprises a controller 7A, a decode processing part 7B and process processing part 7C as shown in FIG. 1. It will be described in detail later.

Data outputted from the decoder 7 is connected to a monitor device 8 so as to monitor the output data.

Here, the encoder 2, the server data controller 6 and the decoder 7 form one input/output processor, and a plurality of the input/output processors embody multi-channels (a plurality of input/output lines). That is, a plurality of the input/output processors each have one input line and one output line, and each input/output processor operates within time slots allotted by time division. Instantaneously, each input/output processor encodes data inputted individually by the encoder 2 and processes until data is outputted from the above-mentioned decoder 7. When looking at the process in a long period of time, it looks as if input data of a plurality of channels is processed and outputted simultaneously.

In an example of the embodiment, one input line and one output line (one channel input/output) are shown to simplify the description.

Next, the whole operation of the data sending out device 1 will be described.

Inputted data SDO is outputted after being converted to a specific format or being compressed by a specific compression method. The data SD1 outputted from the encoder 2 is inputted to the server data controller (SDC) 6, and recorded in the disk array device 3 under control of the system controller 4. The data recorded in the disk array device 3 is controlled by the server data controller 6 by a control command from the system controller 4, and outputted to the decoder (DEC) 7. Data SD3 outputted to the decoder 7 receives a reverse process performed by the encoder 2, such as elongating process if the data is compressed, and is outputted. The outputted data is inputted to the monitor device 8 and monitored. If the decoder 7 is connected to an in-station sending out device (not shown), data is sent out from the sending out device 1 for broadcasting from a broadcasting station.

As described, the sending out device 1 can broadcast at a requested time in an order designated in a data sending out list including at least one of supplied image data or voice data based on, for example, a sending out list made in the system controller 4.

Figure 2:
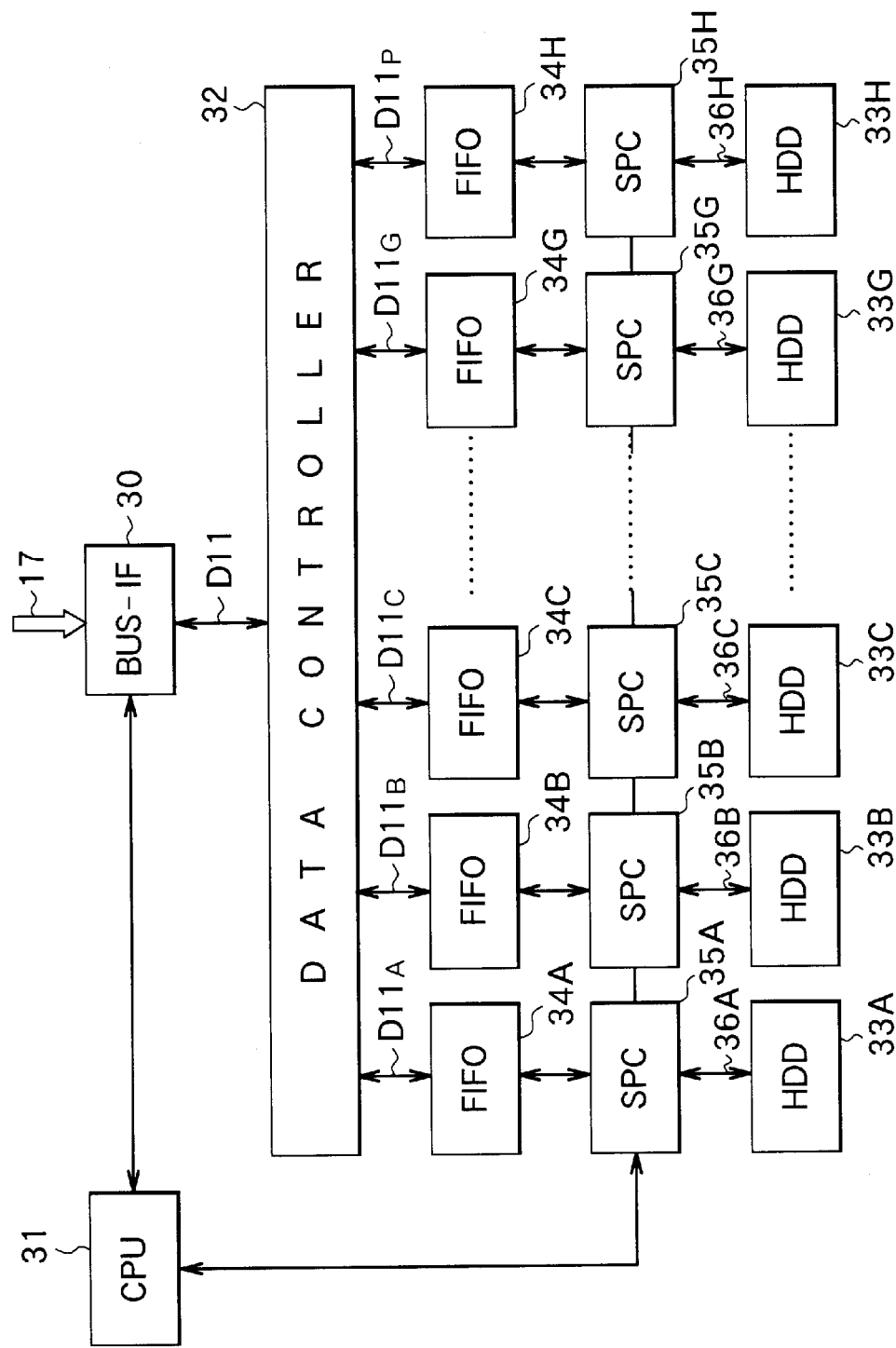
FIG. 2 is a block diagram showing a constitution of a disk array device shown in FIG. 1.

Next, a specified constitution of the disk array device 3 which accumulates data including at least either image data or voice data will be described with reference to FIG. 2.

The disk array device 3 mainly comprises BUS-IF30 which is an interface of bus 17 as a whole, CPU 31 performing various control in RAID, a data controller 32 allotting inputted data D11 to each HDD (hard disk drive) via the BUS-IF30 based on a control of the CPU 31, recording media HDD 33A, ..., HDD 331H for recording inputted data D11 and parity data of the data D11, FIFO (First In First Out) memory 34A, ..., 34H which temporarily store the data D11 allotted by the data controller 32, and SPC (SCSI Protocol Controller) 35A, ..., 35H which are interfaces for having data being inputted from FIFO 34A, ..., 34H and making AV data input/output to/from HDD 33A, ..., 33H which are connected to the SPC via SCSI (Small Computer System Interface) interface 36A, ..., 36H.

The bus 17 between a server data controller 6 and the BUS-IF30 shown in FIG. 1 can transmit and receive the data D11 to which a command data to the disk array device 3 or status data from the disk array device 3 is superposed.

A command data inserted to the data D11 formed in the server data controller 6 is outputted to the CPU 31 from the BUS-IF30. The data controller 32 and the SPC35A, ..., 35H are controlled based on the contents of the command data, and the data D11 is recorded in the HDD 33A, ..., 33H.

The data D11 outputted from the BUS-IF30 is inputted to the data controller 32.

The data controller 32 makes separate data $D11_A$~$D11_G$ by separating the inputted data D11 by, for example, every one byte while making parity data $D11_P$ based on the separate data $D11_A$~$D11_G$ respectively. The parity data $D11_P$ may be even parity which makes the $D11_P$ "1" when the numbers of "1" of the separate data $D11_A$~$D11_G$ is an even number, and the parity data $D11_P$ may be odd parity which makes the $D11_P$ "1" when the numbers of "1" of the separate data $D11_A$~$D11_G$ is an odd number.

Each of the separate data $D11_A$~$D11_G$ separated by the data controller 32 and the parity data $D11_P$ is temporarily stored in the FIFO memories 34A~34G and 34H respectively. These are originally temporary recording memories which absorb HDD 33A~33H operating asynchronously and AV data which is synchronous data inputted via the BUS-IF30.

The separate data $D11_A$~$D11_G$ and the parity data $D11_P$ stored temporarily in the FIFO 34A~34G are outputted to the SPC 35A~35G and 35H respectively. The SPC 35A~25H are controlled by the control of the CPU 31 and the separate data $D11_A$~$D11_G$ and the parity data $D11_P$ stored temporarily are read out to be outputted to each of the SPC 35A~35H.

The separate data $D11_A$~$D11_G$ and the parity data $D11_P$ outputted to each of the SPC 35A~35H are recorded in each of the HDD 33A~33H via SCSI bus 36A~36H under a control of the CPU 31.

A recording operation of AV data D11 to a RAID 18 formed as described above will now be described.

The data D11 outputted from the server data controller 6 is inputted to the BUS-IF30 with a recording command being superposed. The BUS-IF30 controls the data controller 32 and the SPC 35A~35H so as to output command data to the CPU 31, and make the CPU 31 record the data D11 in the HDD 33A~33H. On the other hand, the data D11 outputted from the BUS-IF30 is inputted to the data controller 32 and is separated by, for example, every one byte, while the parity data $D11_P$ is made based on the AV data D11 being separated.

The separate data $D11_A$~$D11_G$ and the parity data $D11_P$ are temporarily stored in the FIFO memories 34A~34H respectively, read out by the SPC 35A~35H, outputted to each HDD 33A~33H via the SCSI bus 36A~36H and recorded.

At this time, each HDD 33A~33H sends out data including status information (information showing "Good" when recorded correctly and "Check Condition" when not recorded correctly) showing whether the separate data $D11_A$~$D11_G$ and the parity data $D11_P$ are recorded correctly to each HD 33A~33H or not via corresponding SPC 35A~35H.

Hereby, when the data D11 is recorded in the disk array device 3, the CPU 31 can recognize which of the HDD 33A~33H has a recording error, based on the status information supplied via the SPC 35A~35H corresponding to each HDD 33A~33H, when a recording error occurs in one of the HDD 33A~33H.

Next, a reproducing operation for reproducing the data D11 recorded in the disk array device 3 will now be described.

After a reproduction command outputted from the server data controller 6 via the bus 17 is inputted to the BUS-IF30, the reproduction command is outputted to the CPU 31 from the BUS-IF30. Upon receiving the reproduction command, the CPU 31 gives a reproduction control command to the SPC 35A~35H and the data controller 32. Each of the SPC 35A~35H makes the separate data $D11_A$~$D11_G$ and the parity data $D11_p$ recorded in each of the HDD 33A~33H reproduce and makes them store to FIFO memories 34A~34H corresponding to the HDD 33A~33H respectively.

Here, each of the HDD 33A~33H sends out status information (information showing "Good" when reproduced correctly, and "Check Condition" when not reproduced correctly, and here, to have information different from the status information which shows if it is recorded correctly or not during the recording operation as described above, for example, one bit flag is placed before the status information to show different status information for recording operation and reproducing operation) which shows if the requested separate data $D11_A$~$D11_G$ and the parity data $D11_p$ are correctly reproduced or not from the HDD 33A~33H.

When the CPU 31 receives status information showing "Good" from all of the HDD 33A~33H, operation of the data controller 32 is set to a normal operation mode, and a data D11 is build based on the separate data $D11_A$~$D11_G$ obtained from each of the FIFO 34A~34G and outputted to the BUS-IF30.

On the other hand, when the CPU 31 receives status information showing "Check Condition" from one of the HDD 33A~33G, the CPU 31 sets operation of the data controller 32 to a parity correction mode. The CPU 31 does not read out data from corresponding FIFO 34~34G corresponding HDD 33A~33G which output the status information showing "Check Condition" and perform a parity correction processing using the separate data $D11_A$~$D11_G$ from other HDD 34A~33G and parity data $D11_p$, thereby the data which is not reproduced correctly is rebuilt.

Further, data read out by the data controller 32 or data to which a parity correction is performed is outputted to the BUS-IF30, and further outputted to SDC 6 from the BUS-IF30 via the bus 17.

These, described above, are the constitution and operation of the disk array device 3.

In the invention, the data sending out device 1 formed as described, has attribute data including process data of image/voice data of inputted data recorded in a predetermined region of a disk array in which image/voice data is recorded. Further, the sending out device 1 updates the recorded process data upon receiving control command to alter the process data from upper control portion. The decoder 7 decodes signal levels and so on of the corresponding image/voice data, based on the recorded process data, and outputs it.

It will be described in detail in the following.

As described above, input data is compressed using MPEG method in the encoder 2 as shown in FIG. 1. The structure of the compressed data is shown in FIG. 3A and FIG. 3B.

The encoder 2 outputs compressed image data corresponding to 1 GOP with voice data corresponding to the image data and attribute data being superposed, which form 1 block (FIG. 3A), to the server data controller 6.

Next, attribute data will be described with reference to FIG. 3B.

Attribute data mainly comprises a command for controlling transmitted image/voice data along with attribute data or showing how it is controlled, intense signal level, hue, format before being encoded and so on of image data, and process data showing signal output level of each channel of voice data. When reproducing image/voice data, it is reproduced with corresponding property and is corrected based on the attribute data, by recording the attribute data in a predetermined region of the recording media.

Attribute data is formed with 11 blocks as shown in FIG. 3B. In the forefront block, data (BLOCK EXIST BIT MAP) 50 showing if data allotted to a block is valid or invalid is allocated.

In the next block, control data 51 of image data and control data 52 of voice data 52 are allocated. By the control data 51 and 52, whether image data is reproduced by fast-forwarding or by reverse reproduction can be judged. How image/voice data is controlled can be recognized by the control data 51 and 52.

Next, Speed information 53 is allocated so that the speed at which image/voice data is transferred can be detected.

Next, information (VIDEO INFORMATION) 54 showing whether image data is valid or invalid is allocated.

In the next three blocks, process data 55, 56, and 57 regarding the first to the third voice data are allocated. In the following block, process data regarding image data is allocated and, in the next block, process data regarding the fourth voice data is allocated.

Correction data of signal level for each channel of the voice data is allotted to the process data of voice data. Further, a video data format of image data before encoding correction data (correction data of black set and white set; black set and white set will be described later) of intensity level and correction data of hue are inserted in the process data of image data.

Next, reserved area (RESERVE) 60 to which predetermined data is inserted is allocated. At last, outer device control command (RS422COMMAND) 61 for controlling device to which data is sent is allocated.

In the encoder 2, data showing invalid is inserted in the valid-invalid region 50 which is the forefront block of the attribute data and the data is outputted, when outputting the data by normal operation.

At this time, a value of default showing that any correction and operation of the signal level regarding image/voice data is unnecessary is inserted in the process data region 55, 56, 57, 58 and 59 shown in FIG. 3B.

In the server data controller 6, data inputted from the encoder 2 based on the control data from the system controller 4 is controlled, as described above. However, data with attribute data being superposed is controlled to be separated to image/voice data and the attribute data, and the image/voice data is recorded, specifically, in an AV recording region of each HDD 33A~33H of the disk array device 3, and the attribute data is recorded in an NAV region of each HDD 33A~33H.

Here, the NAV region is formed on the same recording medium (here, each HD of each HDD 33A~33H) with the AV recording region which is a recording region of the corresponding image/voice data in FIG. 3B.

Further, the server data controller 6 does not record the process data when recording the data outputted from the encoder 2 upon receiving a command of normal recording operation from the system controller 4.

Process data is correction data of image/voice data, as described above. For example, the process data only needs to be recorded when the signal level is altered by performing edit processing of images and voices which have been recorded. Accordingly, the process data does not need to be recorded when performing normal recording operation. Of course, however, the process data may also be recorded in a case of normal recording.

On the other hand, data with the process data being superposed is also recorded in the disk array device 3 upon receiving a command to record data by copying.

A copying operation is an operation in which, for example, data recorded in another disk array device or another data sending out device is recorded in the data sending out device 1 mentioned in the embodiment. Here, the signal level of images and voices recorded in another disk array device and another sending out device may possibly be corrected. By having the correction data, that is process data, recorded during the copying operation, rebuilding the correction levels of image/voice data becomes unnecessary. In other words, there is no need to determine the correction level again by using the edit device and so on.

In the embodiment, the process data included in the attribute data, or only the process data is recorded in each HDD 33A~33H of the disk array device 3, however, it may be recorded in the memory (not shown) of the server data controller 6, corresponding to the image/voice data. Further, it may be recorded in the memory (not shown) of the disk array device 3.

On the other hand, when a reproduction command from the system controller 4 is inputted to the server data controller 6 and the server data controller 6 makes the disk array device 3 control a reproducing operation, the data server controller 6 sends a control command to a data controller 32 of the disk array device 3 to reproduce the corresponding data and so that reproduction processing of the image/voice data described above is performed.

Data outputted via the bus 17 from the disk array device 3 is outputted from the server controller 6 to the decoder 7 having a data structure shown in FIG. 3, which is same as the data structure outputted from the encoder 2.

That is, reproduced data is put into blocks by GOP units, and it is outputted with the process data recorded in the NAV region provided in each HDD 33A~33H of the disk array device 3 being superposed.

Here, when the process data is not recorded in the NAV region of the disk array device 3, a value of default which shows that no correction is performed for signal levels of the image/voice data described above is inserted to the region (FIG. 3B) to which the process data is to be inserted by the data server data controller 6 and the data is outputted.

Further, while the reproduction data is outputted from the disk array device 3 to a decoder, when a control command to correct signal level of the image/voice data (for example, intensity level of image data and output signal level of voice data and so on) is inputted from the system controller 4, the server data controller 6 updates the process data recorded in the NAV region of the disk array device 3, and further, inserts the updated process data with the updated contents to a process data region shown in FIG. 3B. Or when the process data is not recorded in the disk array device 3, the server data controller 6 records the process data with the updated contents to the disk array device 3, and inserts the control information inputted from the system controller 4 to the process data region shown in FIG. 3B.

The decoder 7 receives data having a data structure shown in FIG. 3B, outputted from the server data controller 6, inputs it to a decode processing part 7B, and inputs the attribute data to which the process data is inserted to the controller 7A.

In the decode processing part 7B, decoding is performed with a reverse method of encode processing by the encoder 2 as described. In the encoder 2, data is compressed by MPEG, the data is elongated by MPEG in the decoder 7. At least one of the elongated image data or voice data, S1, is outputted.

The controller 7A to which the attribute data is inputted controls at least one of image or voice data outputted from the decoder processing part 7B, based on the contents of the attribute data.

In other words, when correction data is designated by the process data of the attribute data, the process processing part 7C corrects at least one of image data or voice data outputted from the decode processing part 7B based on the correction data, and outputs it.

For example, when a correction data of brilliance signal level of image data is inserted in the process data, image data outputted from the decoder processing part 7B is corrected based on the contents of the correction data. Further, when an output signal level of voice data is provided in the process data, the voice data outputted from the decoder processing part 7B with the output signal level is processed in the process processing part 7C and outputted.

The image/voice data processed by the controller 7A in the process processing part 7C is outputted to the monitor device 8 and the contents can be verified.

For example, when previewing each edit materials for checking, if, for example, the fact that signal levels of voice data is insufficient compared to other materials is detected by an operator by monitoring the monitoring device 8 and an operation for increasing the level of voice signal is performed via the system controller 4 by the operator, control data responding to the operation is reported from the system controller 4 to the server data controller 6. Then, the corresponding process data is updated as described above, and recorded in the NAV region provided in each HDD 33A~33H of the disk array device 3.

When reproducing again, differences between the voice data and other voice data are corrected by the updated process data or process data provided anew.

The corrected contents is checked in real time by continuously updating the process data, and different alteration can be performed when it is required.

Further, when the storage capacity of the disk array device 3 is needed to be increased, the HDD may be exchanged with the one with a larger capacity.

In such a case, since the above-mentioned process data is recorded in a region of recording medium which is same with the region in which image/voice data is recorded, management by exchanging the disk array device 3 itself can be simplified.

Further, copying data from other data sending out device is performed by recording the process data as it has been accumulated in the past, through recording the above-mentioned process data as it is. As a result, the process data accumulated in the past can be used as it is in other data sending out device.

With the description presented so far, it is evident that various embodiments and modifications of the invention can be achieved. Accordingly, within a range of following claims, the invention can be achieved with other embodiments in addition to the embodiments described above in detail.

What is claimed is:

1. A data recording device for receiving data which includes at least image data or voice data of a plurality of channels, and for recording the data in a plurality of non-linear accessible recording media within time slots allotted to each channel, comprising:

recording means for recording the data being allotted to each of the non-linear accessible recording media, and storing parity data associated with the data recorded in the recording media in a parity data recording medium; and control means for controlling the recording means so as to record correction data for correcting signal levels of the data in the recording media along with the data.

2. A data recording device according to claim 1 wherein the correction data is recorded in the recording media along with the data, when the data is transmitted from another device and copy-recorded in the recording media.

3. A data recording device according to claim 1 further comprising superior control means for controlling the control means, and wherein the control means controls the recording means by a control command from the superior control means so as to record the correction data in the recording media.

4. A data recording device according to claim 3 wherein the control means is controlled by the control command from the superior control means to control the recording means so as to record updated correction data obtained by updating and correcting the recorded correction data, for further correcting the signal levels of the data recorded in the recording media.

5. A data recording method for receiving data which includes at least either image data or voice data of a plurality of channels, and for recording the data in a plurality of non-linear accessible recording media within time slots allotted to each channel, comprising:

a first step of recording the data being allotted to each of the non-linear accessible recording media, and storing parity data associated with the data recorded in the recording media in a parity data recording medium; and a second step of recording correction data for correcting signal levels of the data in the recording media.

6. A data recording method according to claim 5 wherein the correction data is recorded in the recording media along with the data, when the data is transmitted from another device and copy-recorded in the recording media.

7. A data recording method according to claim 5 wherein the correction data is recorded in the recording media by a control command from the superior control means.

8. A data recording method according to claim 7 further including the step of recording updated correction data obtained by updating and correcting the recorded correction data, for further correcting the signal levels of data recorded in the recording media.

9. A data recording/reproducing device for receiving data which includes at least either image data or voice data of a plurality of channels, for recording the data in a plurality of non-linear accessible recording media within time slots allotted to each channel, for reproducing the data recorded in the recording media, and for outputting the data of a plurality of the channels, comprising:

recording/reproducing means for recording the data being allotted to each of the non-linear accessible recording media, and storing parity data associated with the data recorded in the recording media in a parity data recording medium and for reproducing and restoring the data recorded in the recording media; and control means for controlling the recording/reproducing means so as to record correction data for correcting signal levels of the data in the recording media along with the data.

10. A data recording/reproducing device according to claim 9 wherein the correction data is recorded in the recording media along with the data when the data is transmitted from another device and copy-recorded in the recording media.

11. A data recording/reproducing device according to claim 9 further comprising superior control means for controlling the control means, and wherein the control means controls the recording means so as to record the correction data in the recording media by a control command from the superior control means.

12. A data recording/reproducing device according to claim 11 wherein the control means is controlled by a control command from the superior control means to control the recording/reproducing means so as to record updated correction data for further correcting the signal levels of the data recorded in the recording media.

13. A data recording/reproducing device according to claim 9 further comprising decode means for receiving the data outputted from the recording/reproducing device and the correction data, and for correcting the signal level of the data based on the correction data.

14. A data recording/reproducing method for receiving data which includes at least either image data or voice data of a plurality of channels, for recording the data in a plurality of non-linear accessible recording media within time slots allotted to each channel, for reproducing the data recorded in the recording media, and for outputting the data of a plurality of the channels, comprising the steps of:

recording the data being allotted to each of the non-linear accessible recording media, and storing parity data associated with the data recorded in the recording media in a parity data recording medium;

recording correction data for correcting signal levels of the data along with the data; and reproducing the data and the correction data recorded in the recording media.

15. A data recording/reproducing method according to claim 14 wherein the correction data is recorded in the recording media along with the data, when the data is transmitted from another device and copy-recorded in the recording media.

16. A data recording/reproducing method according to claim 14, wherein the correction data is recorded in the recording media through the by a control command from superior control means.

17. A data recording/reproducing method according to claim 16 further comprising the step of recording further correction data for further correcting the signal levels of the data recorded in the recording media.

18. A data recording/reproducing method according to claim 14 further comprising the step of receiving the data and the correction data reproduced in the reproducing step, and correcting the data based on the correction data.

19. A data recording/reproducing device for receiving data which includes at least either image data or voice data of a plurality of channels, for recording the data in a plurality of non-linear accessible recording media within time slots allotted to each channel, for reproducing the data recorded in the recording media, and for outputting the data of a plurality of the channels, comprising:

encode means for compressing the data inputted to each channel and outputting the compressed data with correction data for correcting signal levels of the data;

recording/reproducing means for recording the compressed data being allotted to each of the non-linear accessible recording media, and storing parity data associated with the data recorded in the recording media in a parity data recording medium, for recording the correction data in a predetermined region of the recording media, for reproducing and restoring the compressed data recorded, and reproducing the correction data recorded in the predetermined region; and decode means for elongating the compressed data outputted from the recording/reproducing means.

20. A data recording/reproducing device according to claim 19 wherein the encode means compresses the data by taking advantage of correlation between frames, and outputs the compressed data to which the correction data is superposed by every 1 GOP (Group Of Picture).

21. A data recording/reproducing device according to claim 19 wherein the decode means receives the data outputted from the recording/reproducing device and the correction data, and outputs signal levels of the data being corrected based on the correction data.

22. A data recording/reproducing method for receiving data which includes at least either image data or voice data of a plurality of channels, for recording the data in a plurality of non-linear accessible recording media within time slots being allotted to each channel, for reproducing the data recorded in the recording media, and for outputting the data of a plurality of the channels, said method comprising:

a first step of compressing the data inputted to each channel and outputting the compressed data to which correction data for correcting signal levels of the data being superposed;

a second step of receiving the compressed data outputted from the first step and the correction data, of recording the compressed data being allotted to each of the non-linear accessible recording media, and storing parity data associated with the data recorded in the recording media in a parity data recording medium, of recording the correction data in a predetermined region of the recording media, of reproducing and restoring the compressed data recorded, and of reproducing the correction data recorded in the predetermined region; and a third step of elongating the compressed data.

23. A data recording/reproducing method according to claim 22 wherein the first step compresses the data by taking advantage of correlation between frames, and outputs the compressed data to which the correction data is superposed by every 1 GOP (Group of Picture).

24. A data recording/reproducing method according to claim 22 wherein the third step includes receiving the data and the correction data, and correcting the signal levels of the data based on the correction data.

25. A data recording device for receiving data which includes at least data and/or voice data of a plurality of channels, and for recording the data in a plurality of non-linear accessible recording media within time slots allotted to each channel, comprising:

encoding means for creating data blocks for the received data, each block including the received data and attribute data having a predetermined number of regions for storing at least correction data for correcting signal levels of the received data in the corresponding block;

recording means for recording the received data being allotted to each of the non-linear accessible recording media, and storing parity data associated with the received data recorded in the recording media in a parity data recording medium; and control means for controlling the recording means so as to record the attribute data in the recording media along with the received data in the corresponding block.

26. A data recording method for receiving data which includes at least data and/or voice data of a plurality of channels, and for recording the data in a plurality of non-linear accessible recording media within time slots allotted to each channel, comprising the steps of:

creating data blocks for the received data, each block including the received data and attribute data having a predetermined number of regions for storing at least correction data for correcting signal levels of the received data in the corresponding block;

recording the received data being allotted to each of the non-linear accessible recording media, and storing parity data associated with the received data recorded in the recording media in a parity data recording medium; and controlling the recording means so as to record the attribute data in the recording media along with the received data in the corresponding block.

* * * * *